United States Patent
Crevatin et al.

(10) Patent No.: US 11,499,676 B2
(45) Date of Patent: Nov. 15, 2022

(54) METHOD FOR FILLING A TANK WITH LIQUEFIED GAS

(71) Applicant: L'Air Liquide, Societe Anonyme pour l'Etude et l'Exploitation des Procedes Georges Claude, Paris (FR)

(72) Inventors: Stephane Crevatin, Sassenage (FR); Jean-Marc Peyron, Champigny-sur-Marne (FR)

(73) Assignee: L'Air Liquide, Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/382,073

(22) Filed: Jul. 21, 2021

(65) Prior Publication Data
US 2022/0026025 A1   Jan. 27, 2022

(51) Int. Cl.
*F17C 5/02* (2006.01)
*F17C 13/04* (2006.01)

(52) U.S. Cl.
CPC .............. *F17C 5/02* (2013.01); *F17C 13/04* (2013.01); *F17C 2221/012* (2013.01); *F17C 2221/017* (2013.01); *F17C 2227/0337* (2013.01)

(58) Field of Classification Search
CPC ...... F17C 5/02; F17C 13/04; F17C 2221/012; F17C 2221/017; F17C 2227/0337
USPC .......................................................... 141/1
See application file for complete search history.

(56) References Cited

U.S. PATENT DOCUMENTS

| | | | |
|---|---|---|---|
| 5,465,583 A * | 11/1995 | Goode | F17C 5/007 141/4 |
| 6,622,758 B2 * | 9/2003 | Drube | F17C 5/02 141/192 |
| 6,640,554 B2 * | 11/2003 | Emmer | F17C 5/007 220/560.1 |
| 10,415,509 B2 | 9/2019 | Svoboda | |

(Continued)

FOREIGN PATENT DOCUMENTS

FR   3 017 183   8/2015
JP   2007 303 605   11/2007

(Continued)

OTHER PUBLICATIONS

JP-2007303605-A English Translation of Specification (Year: 2021).*

(Continued)

*Primary Examiner* — Reinaldo Sanchez-Medina
*Assistant Examiner* — Stephanie A Shrieves
(74) *Attorney, Agent, or Firm* — Christopher J. Cronin

(57) ABSTRACT

Method for filling a liquefied gas tank with pressurized liquefied gas from a source of liquefied gas using a filling apparatus comprising a transfer circuit that is provided with first and second pipes, each connecting between the source via respective first ends and the tank via respective second ends, third and fourth pipes each connecting between the first and second pipes, and a set of valves controlling flows of fluid in the pipes. The tank is depressurized and at least part of the circuit is cooled by transferring pressurized vaporization gas from the tank to the first end of the second pipes via the second end of the second pipe, the third pipe, the first pipe, and the fourth pipe.

6 Claims, 1 Drawing Sheet

(56) References Cited

U.S. PATENT DOCUMENTS

| | | | | |
|---|---|---|---|---|
| 2006/0130925 A1* | 6/2006 | Bourgeois | ............... | F17C 9/00 |
| | | | | 141/82 |
| 2008/0078188 A1* | 4/2008 | Matheoud | ............... | F17C 5/02 |
| | | | | 62/50.1 |
| 2009/0308083 A1* | 12/2009 | Brunner | ............... | F17C 9/02 |
| | | | | 62/50.2 |
| 2011/0179810 A1 | 7/2011 | Sipilae et al. | | |
| 2014/0261874 A1* | 9/2014 | Mathison | ............... | F17C 5/007 |
| | | | | 141/11 |
| 2021/0364129 A1* | 11/2021 | Allidieres | ............... | F17C 6/00 |

FOREIGN PATENT DOCUMENTS

| | | | | |
|---|---|---|---|---|
| JP | 2007303605 A | * | 11/2007 | |
| WO | WO-2016052374 A1 | * | 4/2016 | ............... F17C 13/00 |

OTHER PUBLICATIONS

WO-2016052374-A1 English Translation of Specification (Year: 2021).*

French Search Report and Written Opinion for FR 2 007 658, dated Mar. 23, 2021.

* cited by examiner

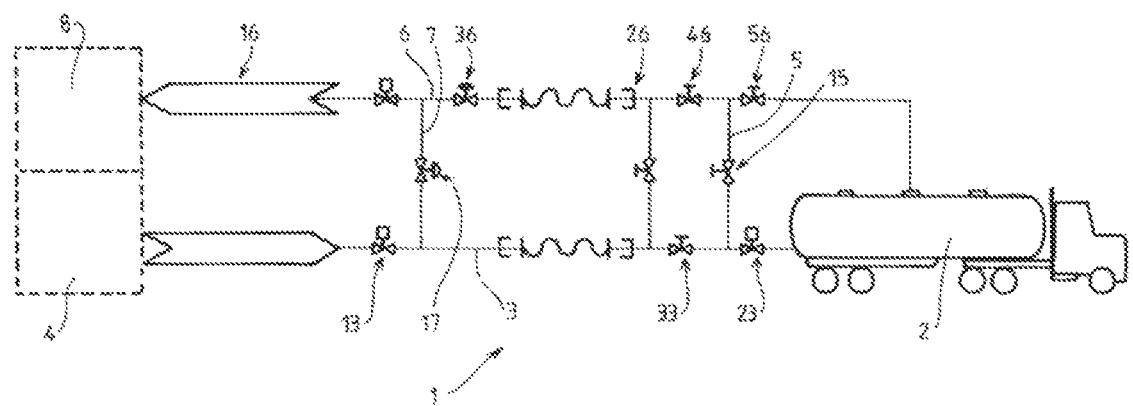

METHOD FOR FILLING A TANK WITH LIQUEFIED GAS

CROSS-REFERENCE TO RELATED APPLICATIONS

This application claims the benefit of priority under 35 U.S.C. § 119 (a) and (b) to French patent application No. FR2007658, filed Jul. 21, 2020, the entire contents of which are incorporated herein by reference.

BACKGROUND

Field of the Invention

The invention relates to a method for filling a tank with liquefied gas.

The invention relates more particularly to a method for filling a tank with pressurized liquefied gas from a source of liquefied gas, using a filling apparatus comprising a transfer circuit provided with a first pipe for liquid transfer comprising a first end connected to the source of liquefied gas and a second end connected to the liquefied gas tank, a second pipe for gas transfer comprising a first end connected to a gas recovery member and a second end connected to said tank to be filled, the circuit comprising a third transfer pipe and a fourth transfer pipe, each connecting the first and second transfer pipes, the circuit comprising a set of valves for controlling the flows of fluid in the pipes of the circuit, the method comprising, prior to the transfer of liquefied gas from the source of liquefied gas to the liquefied gas tank, a depressurization of the liquefied gas tank and a cooling of at least part of the transfer circuit.

Related Art

Before the sequence of filling a tank with liquefied gas, the circuit, such as the flexible tubing of the tank to be filled, is generally at ambient temperature. In this case, the whole arrangement must be cooled to the temperature of the liquefied gas before filling, for example, 21.7K in the case of liquid hydrogen.

The cooling is at present provided by a flow of liquid hydrogen coming from the storage source. This causes vaporization of the liquid hydrogen during the entire cooling of the liquid transfer pipe. Depending on the installation, between 5 and 15 kg of liquid hydrogen is evaporated, and the duration of the operation can vary from 5 to 10 minutes.

This cooling wastes time and causes a loss of cold of the fluid produced by the liquefier having filled the source.

The cold molecules of the depressurization are generally recovered by passing through a heater and then a cycle compressor. The frigories, which are costly in terms of energy, are not exploited.

The energy necessary for the liquefaction of the air gases is much less than hydrogen. For this reason, the gaseous returns are not utilized and the molecules are not always recovered.

In the case of a liquid helium installation, recovery of the molecules is generally carried out. The recovery of the frigories can be integrated in the liquefaction system.

Cold helium can be directly injected at different stages of the liquefier depending on the temperature of the gaseous return.

SUMMARY OF THE INVENTION

One aim of the present invention is to overcome all or some of the abovementioned disadvantages of the prior art.

To this end, the method according to the invention, furthermore in accordance with the generic definition given in the preamble above, is essentially characterized in that the depressurization of the liquefied gas tank and the cooling of the transfer circuit comprises a transfer of pressurized vaporization gas contained in the liquefied gas tank via the second end of the second pipe for gas transfer, the third transfer pipe, the first transfer pipe, the fourth transfer pipe and the first end of the second transfer pipe.

The depressurized cold gas is thus diverted to the liquid transfer line to be cooled.

The method thus makes it possible to utilize the cold gas coming from the tank that is to be filled. This could be done, for example, before passing this gas through a heater.

Furthermore, embodiments of the invention can comprise one or more of the following characteristics:

- the pressurized vaporization gas transferred from the liquefied gas tank to the first end of the second transfer pipe is reheated and vented and/or compressed and/or stored in the gas recovery member,
- the third and fourth transfer pipes are situated respectively at the two ends of the circuit, that is to say respectively at the second ends of the first and second transfer pipes and at the first ends of the first and second transfer pipes,
- the third and fourth transfer pipes each comprise a set of respective valves,
- the liquefied gas tank, before its depressurization, is at a pressure of between 1.2 and 10 bar, for example between 1.4 and 7 bar, and, after depressurization, is at a pressure of between 1.1 and 1.4 bar,
- the method comprises, after the depressurization of the liquefied gas tank and the cooling of at least part of the transfer circuit, a step in which liquefied gas is transferred from the source to the liquefied gas tank via the first transfer pipe,
- the liquefied gas is hydrogen or helium.

The invention may also relate to any alternative apparatus or method comprising any combination of the features above or below within the scope of the claims.

BRIEF DESCRIPTION OF THE FIGURES

Further distinctive features and advantages will become apparent on reading the description below, made with reference to the figures, in which:

FIG. 1 shows a schematic and partial view illustrating an example of the configuration and operation of the filling apparatus and method according to the invention.

DETAILED DESCRIPTION OF THE INVENTION

The apparatus 1 comprises a fluid circuit provided with a first pipe 3 for liquid transfer comprising a first end, for example to the left of a valve 13 in the schematic view, intended to be connected to a source 4 of liquefied gas, in particular to the liquid phase of a supply tank, and a second end, for example to the right or left of a valve 23 in the schematic illustration, intended to be connected to a tank 2 to be filled, in particular to its liquid phase.

The source 4 typically comprises a store of liquefied gas surmounted by a gaseous phase. The source is or can be pressurized, it being possible for this pressure to be the force that drives the fluid to be transferred. A transfer pump may also be envisaged.

The circuit comprises a second pipe 6 for gas transfer, comprising a first end 16 intended to be connected to the source 4 of liquefied gas, for example to its gaseous phase, or to a gas recovery member 8, and a second end intended to be connected to said tank 2 to be filled, for example to its gaseous phase.

The circuit comprises a third transfer pipe 5 connecting the first 3 and second 6 so transfer pipes and provided with a valve 15.

The circuit comprises a fourth transfer pipe 7 connecting the first 3 and second 6 transfer pipes and provided with a valve 17.

The third transfer pipe 5 and the fourth transfer pipe 7 are preferably situated at the two ends of the circuit, respectively, towards the tank 2 to be filled and towards the source 4.

For example, and without limitation, the third pipe 5 can be part of a circuitry integral with the tank 2 and provided with fluidic connectors such as removable or quick connectors and configured to be connected to tubing forming the first 3 and second 6 pipes, for example, to the right of the flexible portions shown symbolically by wavy lines.

The circuit comprises a set of valves for controlling the flows of fluid in the pipes of the circuit. For example, the first pipe 3 for liquid transfer comprises at least one insulation and/or flow control valve 33.

Similarly, the second transfer pipe 6 comprises at least one insulation and/or flow control valve 36, 46.

This architecture permits filling of tanks 2 in single flow, in first liquid pipe 3, or in double flow, in first pipe 3 transferring liquid and second pipe 6 evacuating gas in the opposite direction.

The third transfer pipe 5 and the fourth transfer pipe 7 each preferably comprise at least one insulation and/or flow control valve 15, 17.

Before the transfer of liquefied gas from the source 4 to the liquefied gas tank 2, a depressurization of the liquefied gas tank 2 and a cooling of at least part of the transfer circuit must be carried out.

At least part of the depressurization of the liquefied gas tank 2 and the cooling of the transfer circuit are carried out by transfer of pressurized vaporization gas contained in the liquefied gas tank 2 via the second end 26 of the second pipe 6 for gas transfer, the third transfer pipe 5, the first transfer pipe 3, the fourth transfer pipe 7 and the first end 16 of the second transfer pipe 6.

That is to say, the flow of cold depressurization gas is diverted on at least part of the first liquid pipe 3 via deviations that are formed by the third transfer pipe 5 and fourth transfer pipe 7. This can be achieved by control of the appropriate valves, for example, by valves 15, 33, 17, 56 being open during this depressurization and the others being closed.

This cooling of the circuit is thus effected during the depressurization and the evaporation of the liquefied gas at the start of filling. For a hydrogen application, this process permits a reduction in evaporation of 0.02 kg to 0.08 kg of hydrogen (H2) depending on the installation.

This makes it possible to utilize gaseous returns of the tank 2 to be filled by virtue of the cooling of the liquid line 3 during the depressurization step.

This solution has numerous advantages.

Thus, this method permits a saving in terms of the energy balance because no flashing of the liquid coming from the source 4 or a liquefier occcurs.

This solution makes it possible to save 4 to 14 kg of liquid hydrogen by cooling, at each filling, depending to the installation.

Moreover, this solution allows time to be saved in the sequence of filling tanks 2 with hydrogen, such as 5-10 minutes depending upon the installation, without loss of substance.

As is illustrated, the circuit can have several transverse pipes connecting the first pipe 3 to the second pipe 6, particularly towards the tank 2 to be filled. For example, two transverse pipes are provided at the second end and can each be provided with a valve. These two transverse pipes can be rigidly connected to the tank 2. Moreover, two valves 33, 46 can be provided between these two transverse pipes, respectively on the first and second transfer pipes.

The flow of vaporization gas coming from the tank 2 to be filled can be conveyed through one or more of these transverse pipes by the appropriate opening of the set of valves.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for filling a liquefied gas tank with pressurized liquefied gas from a source of liquefied gas, comprising:
    transferring liquefied gas from the source of liquefied gas to the liquefied gas tank using a filling apparatus comprising a transfer circuit that is provided with a first pipe for liquid transfer, a second pipe for gas transfer, a third pipe, a fourth pipe, and a set of valves for controlling flows of fluid in said pipes, the first pipe comprising a first end connected to the source of liquefied gas and a second end connected to the liquefied gas tank, the second pipe comprising a first end connected to a gas recovery member and a second end connected to said liquefied gas tank, each of the third and fourth pipes connecting the first and second pipes; and prior to the transfer of liquefied gas from the source of liquefied gas to the liquefied gas tank, depressurizing the liquefied gas tank and cooling at least part of the transfer circuit, wherein said step of depressurizing and cooling comprises transferring pressurized vaporization gas contained in the liquefied gas tank via the second end of the second pipe, the third pipe, the first pipe, the fourth pipe, and the first end of the second pipe.

2. The method of claim 1, wherein the third pipe is situated at the second ends of the first and second pipes and the fourth pipe is situated at the first ends of the first and second pipes.

3. The method of claim 1, wherein the liquefied gas tank, before said step of depressurizing and cooling, is at a pressure of between 1.2 and 10 bar and, after said step of depressurizing and cooling, is at a pressure of between 1.1 and 1.4 bar.

4. The method of claim 3, wherein the liquefied gas tank, before said step of depressurizing and cooling, is at a pressure of between 1.4 and 7 bar.

5. The method of claim 1, further comprising, after said step of depressurizing and cooling, a step of transferring liquefied gas from the source to the liquefied gas tank via the first transfer pipe.

6. The method of claim 1, wherein the liquefied gas is hydrogen or helium.

* * * * *